United States Patent
Beckmeyer et al.

[11] Patent Number: 5,731,562
[45] Date of Patent: Mar. 24, 1998

[54] METHOD OF MAKING A CERAMIC CATALYTIC CONVERTER OPEN CELL SUBSTRATE WITH ROUNDED CORNERS

[75] Inventors: Richard Frederick Beckmeyer, Clarkston, Mich.; Siegfried Franz Gruber, Westmont, Ill.

[73] Assignee: General Motors Corporation, Detroit, Mich.

[21] Appl. No.: 781,306

[22] Filed: Jan. 13, 1997

Related U.S. Application Data

[62] Division of Ser. No. 573,778, Dec. 18, 1995.

[51] Int. Cl.$^6$ .................. B23H 9/00; B23H 7/06
[52] U.S. Cl. ............................................ 219/69.12
[58] Field of Search ............... 219/69.17, 69.12; 264/177.12; 425/461, 462, 463; 205/665; 76/107.1

[56] References Cited

U.S. PATENT DOCUMENTS

| | | | |
|---|---|---|---|
| 3,853,485 | 12/1974 | Hogan | 422/177 |
| 3,903,341 | 9/1975 | Gerhold | 428/116 |
| 4,329,162 | 5/1982 | Pitcher, Jr. | 55/523 |
| 4,348,360 | 9/1982 | Chang et al. | 422/122 |
| 4,448,828 | 5/1984 | Mochida et al. | 428/36 |
| 4,711,009 | 12/1987 | Cornelison et al. | 29/157 R |
| 4,928,485 | 5/1990 | Whittenberger | 60/299 |
| 4,984,487 | 1/1991 | Beckmeyer | 76/107.1 |
| 5,026,273 | 6/1991 | Cornelison | 431/170 |
| 5,066,215 | 11/1991 | Peters et al. | 264/177.12 |
| 5,308,568 | 5/1994 | Lipp | 264/177.12 |
| 5,322,537 | 6/1994 | Nakamura et al. | 55/523 |
| 5,322,599 | 6/1994 | Peters | 205/665 |
| 5,402,692 | 4/1995 | Bennett | 76/107.1 |
| 5,630,951 | 5/1997 | Peters | 219/69.12 |

FOREIGN PATENT DOCUMENTS 2143445  2/1985  United Kingdom.

Primary Examiner—Geoffrey S. Evans
Attorney, Agent, or Firm—Cary W. Brooks

[57] ABSTRACT

A ceramic catalytic converter is made by first creating an electrode by cutting space apart holes through an electrode block, threading an electrode wire through each hole in the block and performing wire cutting electrical discharge machining to form a cutting surface with a plurality of cell walls converging at rounded corners. The electrode is used to cut an extrusion die, a feedhole is provided in the die (preferably connected to a corner of the cell), and ceramic material is extruded through the extrusion die to form an extruded substrate having a plurality of open cells defined by adjacent walls converging in a rounded corner to form the ceramic catalytic converter. The rounded corner cell walls allows a more uniform deposit of washcoat and precious metals and reduces the amount of precious metals necessary in the ceramic catalytic converter.

9 Claims, 6 Drawing Sheets

METHOD OF MAKING A CERAMIC CATALYTIC CONVERTER OPEN CELL SUBSTRATE WITH ROUNDED CORNERS

This is a division of application Ser. No. 08/573,778 filed on 18 Dec. 1995, pending.

FIELD OF THE INVENTION

This invention relates to ceramic catalytic converter substrates and methods of making the same, and more particularly to ceramic substrates having cells with rounded corners and/or a honeycomb or hexagonal design.

BACKGROUND OF THE INVENTION

A variety of ceramic catalytic converter substrates are known. Commercial forms of these ceramic catalytic converter substrates have thin walls (0.006–0.008 inches) and square or triangular shaped cells. The substrate is formed by extruding a green ceramic mixture through an extrusion die. The extruded plasticized material is then dried and fired to provide a hard solid cordierite catalytic converter substrate. Other ceramic materials with suitable thermal shock resistance and melting temperature can be used. A washcoat is applied to the fired substrate and catalyst solutions are impregnated into the washcoat. Thereafter, the substrate is clamped into a suitable catalytic converter housing with an expanding mat compressed between the substrate and the housing.

Extrusion dies for making catalytic converter substrates are made by forming a grid pattern from the front side of a die plate which meets with a feed pattern formed from the back side of the die plate. The grid patterns are formed by grinding wheels, saw blades, or wire electric discharge machining (EDM). All of these processes cut or burn straight slots within the grid portion of the extrusion plates. The square or triangular shaped slots are formed by intersecting lines cut by the grinding wheels, saw blades, or wire EDMs. As a result, the cells formed in the die plate and within the extruded substrate are in a line. Further, the cell walls and cells have sharp corners because they are formed by the intersection of lines in the cutting process. The feed patterns are generally made by peck or gun drill or EDM.

Applicants have discovered that when substrates having square or triangular shaped cells are coated with a washcoat, a build-up of washcoat occurs in the sharp corners of the cells. Consequently, when the catalyst solution is impregnated into the washcoat, a greater concentration occurs in the corners of the cell where the washcoat is the heaviest. Thus, an unnecessary and uneven concentration of catalyst is formed within the cells increasing the cost of the substrate.

The square or triangular shaped cell walls formed in the substrate may cause additional problems because they are formed by intersecting lines cut in the extrusion die. When these substrates are clamped in an oval-shaped catalytic converter housing, a substantial clamping force is applied to the substrate to compress the expanding mat along lines intersecting the corners of the square or triangular shaped cell walls where they are the weakest. This may cause damage or cracking of the substrate during assembly or in the field.

The present invention provides advantages over the prior art.

SUMMARY OF THE INVENTION

The invention includes a ceramic catalytic converter substrate having cell walls with rounded corners. In a preferred embodiment, the cell walls have a honeycomb or hexagonal shape with rounded corners. The cell walls may be manufactured in the die plate to produce very thin substrate walls, less than 5/1000 inch. Suitable coatings can be applied to the die walls (by a variety of processes such as CVD) to reduce the substrate cell walls further to 3/1000 inches. Preferred embodiments provide increased structural strength of the substrate due to rounded corners of cell walls and/or due to honeycomb or hexagonal shaped walls. The rounded corners of the cell walls also substantially increases the strength of the substrate. The honeycomb shape of the substrate uniformly dissipates any force applied to the substrate. Further, the rounded corner cell walls also allow for a more uniform deposit of washcoat and precious metals thus reducing the amount of precious metals necessary to coat the substrate along with reducing the additional back-pressure of the exhaust system caused by the washcoat which normally forms fillets in corners of squared-celled substrates.

The invention also includes a method of making an electrode to burn the grid configured in the shape substantially mirroring the substrate to be produced; an improved method for making the feedholes which meet with the grid; a method of using such grid and feedhole electrodes to burn an extrusion die, and a method of using such die to extrude a ceramic substrate.

These and other objects, features and advantages will become apparent from the following brief description of the drawings, detailed description and appended claims and drawings.

DETAILED DESCRIPTION

Figure 1:
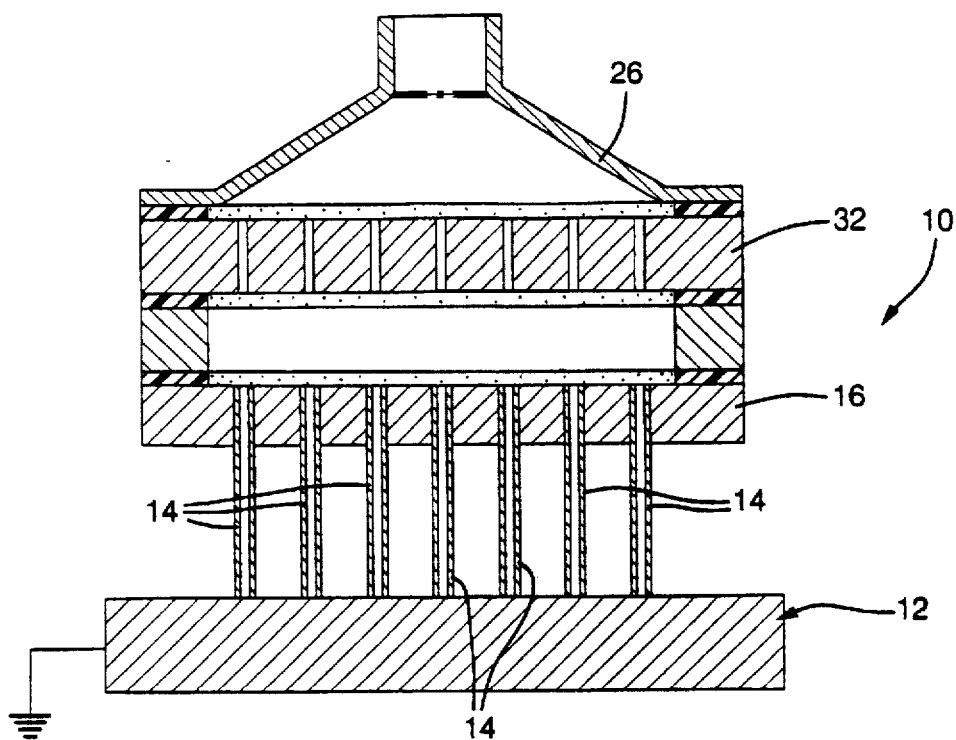
FIG. 1 is an illustration of an EDM machine used to make grid electrodes and extrusion dies according to the present invention.

FIG. 1 illustrates an apparatus 10 and a method of making an electrode 12 according to the present invention. The electrode 12 is utilized to burn the extrusion die grid which in turn is utilized to extrude the ceramic catalytic converter substrate once the feedholes which communicate with the grid are also machined into the die. An electrode assembly is made to initiate the burning of the grid electrode 12 by taking a plurality of cutting elements 14 and putting them into a bundle formation using a spacer 16 having holes formed therein for carrying cutting elements. Conductive epoxy is used to cement the tubes into position. A preferred cutting element 14 is made from a carbide material in a tubular shape. The carbide material is preferred because of its low wear rate during burning and it is economical. Tubing is preferred because flushing can be accomplished by sucking fluid through the inner diameter (inside) of the tube. The spacer 16 may be made from any of a variety of conducting and dimensionally stable materials such as tool steel and copper-tungsten.

Figure 2A:
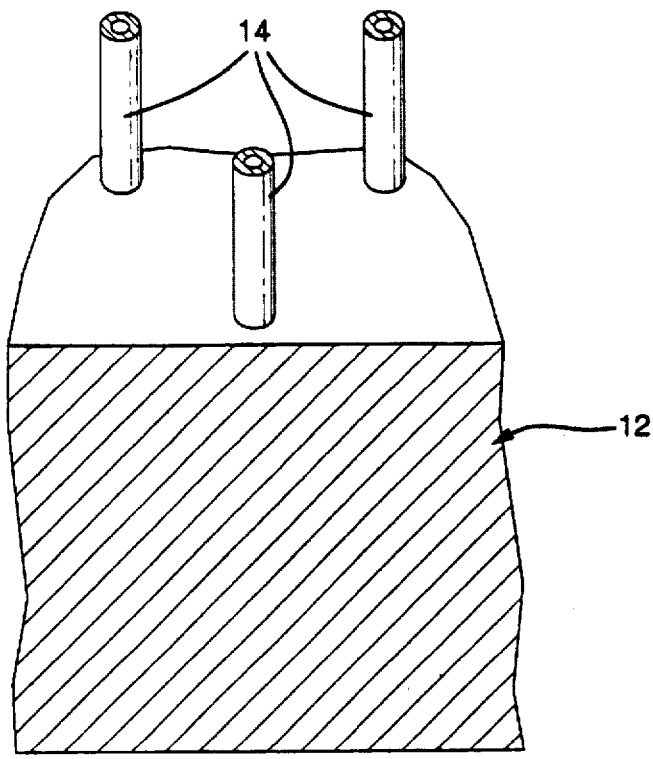
FIG. 2A is an enlarged partial view of cutting elements contacting an electrode block according to the present invention.
Figure 2B:
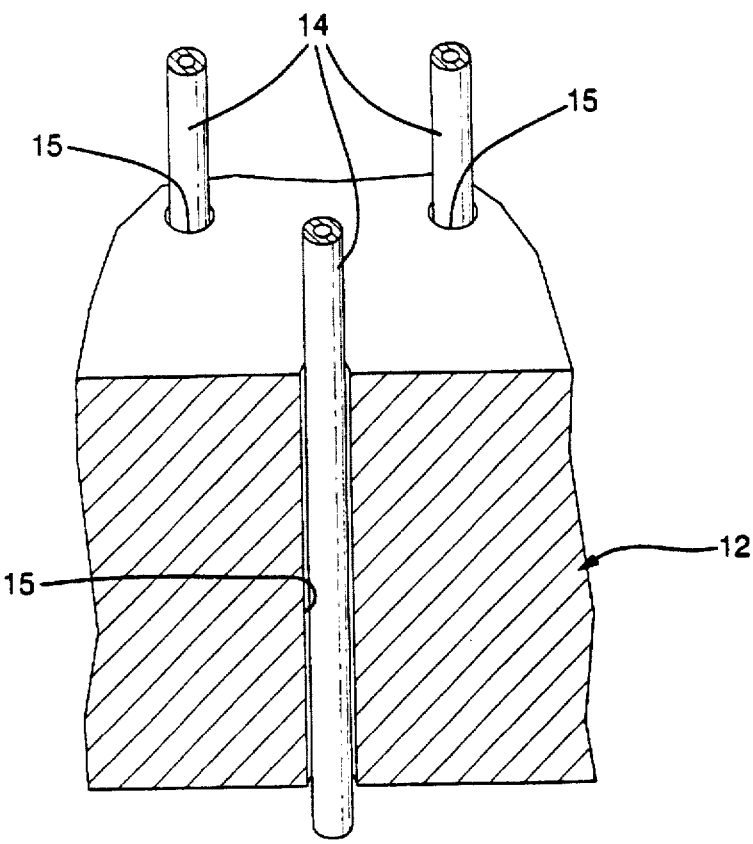
FIG. 2B is an enlarged partial view of cutting elements extending through an electrode block according to the present invention.

A block of electrode material 12 is provided which preferably is made from a copper-tungsten alloy. This is because copper-tungsten is very dimensionally stable and exhibits a low wear rate when burning tool steel, and it is easily burned by the carbide tubes. The cutting elements 14 and the electrode block 12 are oppositely charged so that material from the block is removed during the process. The bundle of cutting elements 14 engage the block 12 surface (FIG. 1 and FIG. 2A) to cut or burn holes 15 through the block (FIG. 2B) at a location that corresponds to the center of the open cell of the substrate to be extruded. A flow distributor 32 having holes therein is provided for communicating with the tubular cutting elements 14. The flow distributor 32 is made from a 0.5 inch thick aluminum piece (aluminum because its easy to drill) with at least 1 inch additional material outside the drill area to seal upon to make the fluid flow through the machined holes. The aluminum flow distributor is drilled with 1/32 inch holes at location corresponding to holes to be burned by the carbide tubes into the electrode 12. So, if 10,000 cells are required in the die, a matching pattern of 10,000 holes would be in the flow distributor 32. A flow distributor or plate with fewer and larger diameter holes may also be used. A vacuum manifold 26 is used to suck away flush fluid, such as an electrolyte, and cuttings drawn up through the cutting element 14 and flow distributor 32. A detailed description of the system is provided hereafter.

Figure 2C:
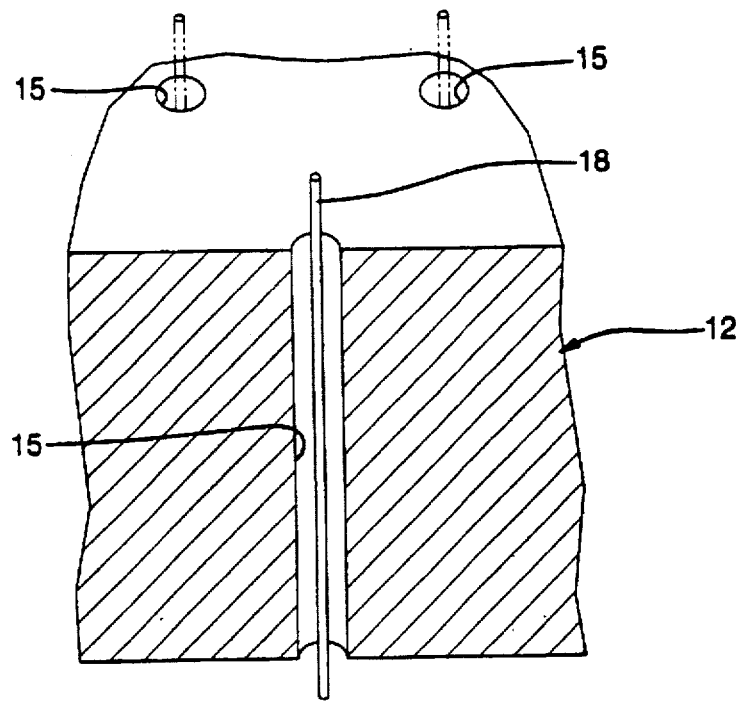
FIG. 2C is an enlarged view of an EDM wire, used to cut a grid electrode, extending through a hole in an electrode block according to the present invention.
Figure 2D:
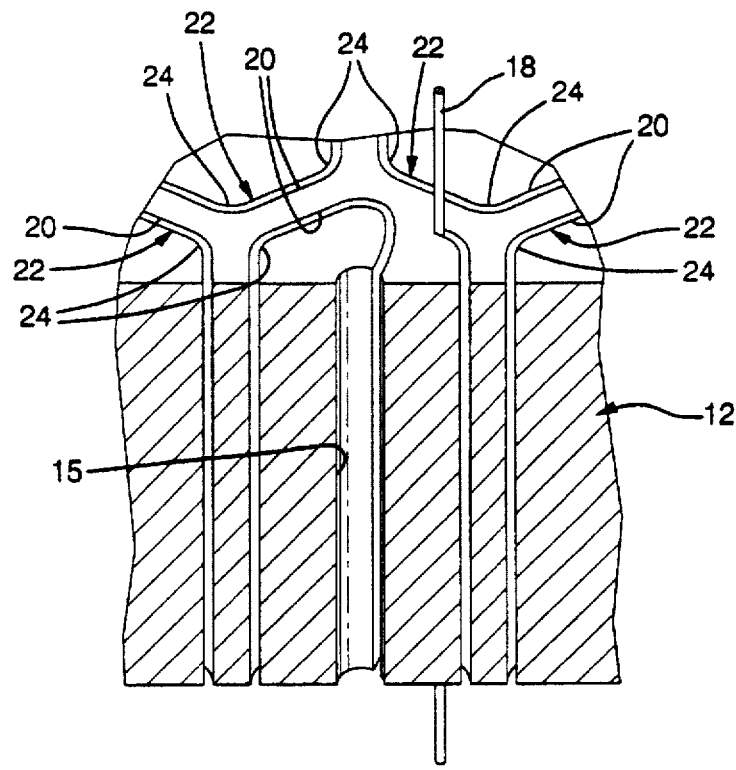
FIG. 2D illustrates the step and path of the EDM wire cutting a grid electrode according to the present invention.
Figure 2E:
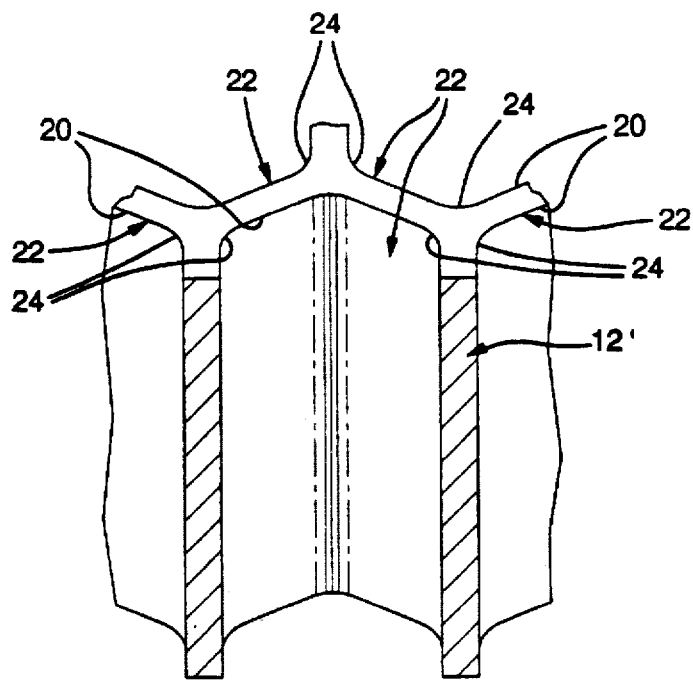
FIG. 2E is a grid electrode according to the present invention.

Preferably, the electrode block 12 is about 1 inch thick. This allows for about 5/8 inch of usable electrode exposure which can be used to burn many grids over its life. In FIG. 2C, after the initial holes are burned in as described above, an electrical discharge wire 18 is threaded through one hole in the block. The EDM wire 18 is worked in a spiral pattern (FIG. 2D) from each hole near the center of the cell to the edge 20 of each cell wall to be formed in the electrode block. Each cell 22 (FIG. 2E) is completed by following a continuous path with the wire starting from the hole to the cell wall. Using this continuous path, the cell walls are formed with corners 24 that have a slight radius because of the diameter of the wire used to fabricate the electrode. Preferably, the slight radius is about 0.004 inches or less for a wire having a diameter of about 0.008 inches. The radius shown in FIG. 2D is exaggerated for purposes of clarity of illustration. When one cell is completed, the wire is threaded through the next starting hole, and this process is followed until all cells 22 are formed. A thick border section (not shown) may be provided on the periphery of the electrode. The border provides the necessary rigidity to guarantee dimensional stability of the electrode when it is utilized to cut the extrusion die. This thick border section of the electrode would be external to the actual die grid being burned. The electrode may be formed with cell walls having a square, triangle, or most preferably a honeycomb or hexagonal shape. In each case, the cell walls have rounded corners as described above.

Figure 3:
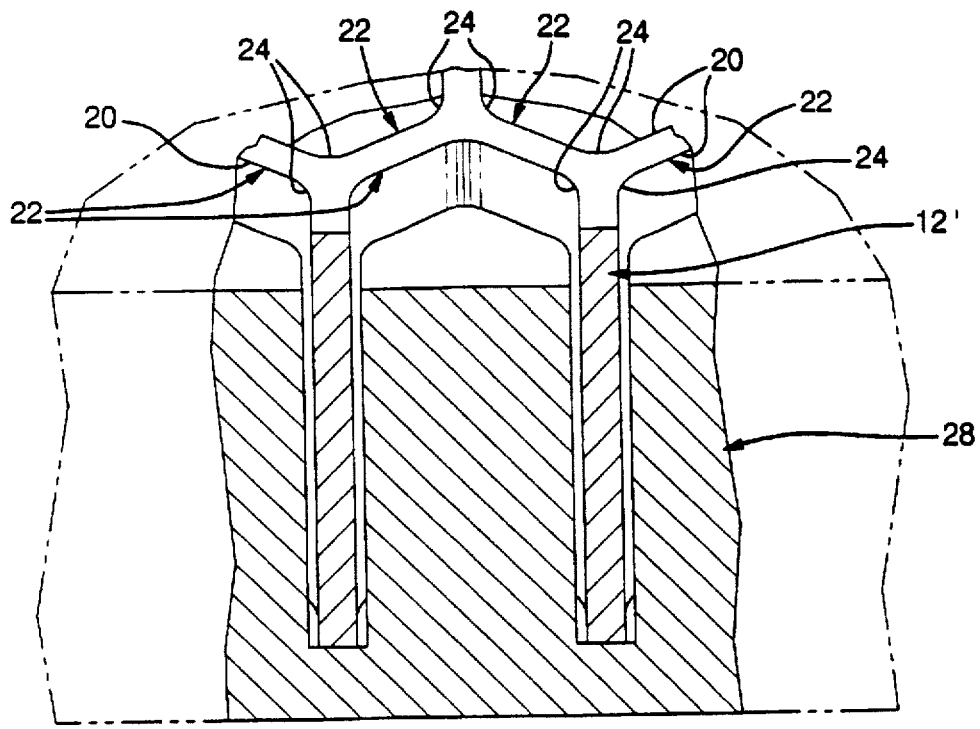
FIG. 3 is an enlarged partial view illustrating a grid electrode cutting an extrusion die according to the present invention.

Using an assembly similar to FIG. 1, the finished electrode 12 is now glued with conductive epoxy into a ⅛ inch thick plate with an area machined to accept the grid electrode 12' is operatively connected to a sinker EDM machine and set up to provide a flushing condition wherein electrolyte is forcibly moved between the electrode and the die to be cut in the same manner as with the cutting elements 14 from FIG. 1. This is done by providing suction through a manifold 26 above the grid electrode 12' with passages machined therein so as to provide even flow rates across the entire grid electrode 12'. In FIG. 3, the grid electrode 12' cuts an extrusion grid design in an extrusion block 28. It has been found that the time to burn an entire 4 by 8 inch die is less than 10 hours as compared to many days of machining required by the prior art. Further, the flushing system provides an excellent surface finish in the extrusion die while minimizing electrode wear so that many dies could be burned with a single electrode.

The present invention provides a reuseable grid electrode 12' that once it is fabricated results in low cost machining time. Unlike the prior art, there is very little chance of scrapping a die in the late hours of machining with the present invention. The present invention provides reduction of variation from die to die reducing run-in time. More significantly, the present invention provides the capability of burning very thin slots and producing very thin walls less than 0.005 inches and even down to 0.003 inches with suitable coatings. Further, the present invention can be utilized to produce virtually any cell shape in the electrode or extruded catalytic converter substrate.

Figure 4:
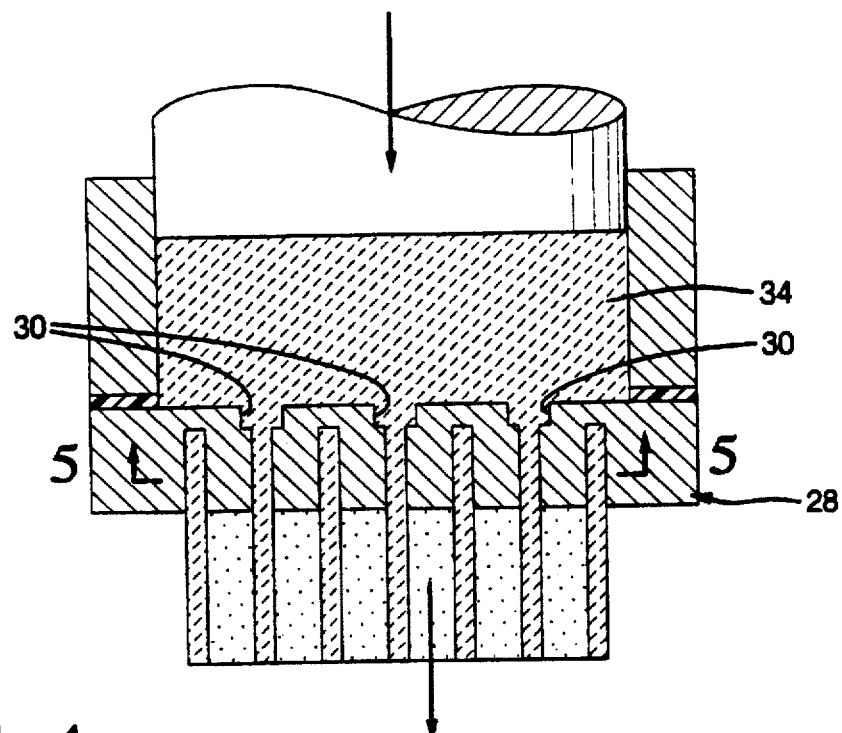
FIG. 4 is an illustration of the step of extruding a ceramic material through an extrusion die according to the present invention.

Once the grid electrode 12' cuts the cell wall extrusion design (grid) into the top face of the die 28, feedholes 30 as shown in FIG. 4 are formed from the back face of the die connecting to the burned-in cell wall design.

The feedholes 30 in the extrusion die 28 can also be formed economically and accurately by using a bundle of carbide tubes to cut the feed holes similar to the method used to form the starting holes in the grid electrode. The setup for burning the holes into the die and burning the holes into the electrode are the same. The only difference from the description previous for burning the holes into the electrode is that the flow distributor 32 now has 1/32 inch holes at the center of the holes being burned into the die 28 so the holes will have different spacing to match that pattern. In this case, the electrode assembly is orbited on a sinker EDM and the feedholes burn out of the die. A feedhole may be formed and connected to cells as shown in FIG. 4. Again, carbide tubes are chosen for the same reasons as described previously. Once the electrode assembly is made it can be used to burn feedhole patterns on many dies before it is eroded away. In both the burning of the grid into the die and the burning of the feedholes, rounded bottom slots and holes are to be avoided because this is the transition area for the plastic ceramic mass. This is accomplished by burning a near final depth in one step, facing off the electrode on a wire EDM, and then finishing the burn down to full depth. This eliminates any possible restriction in the area where the plastic ceramic mass must flow laterally from the feedholes to fill the grid.

Figure 5:
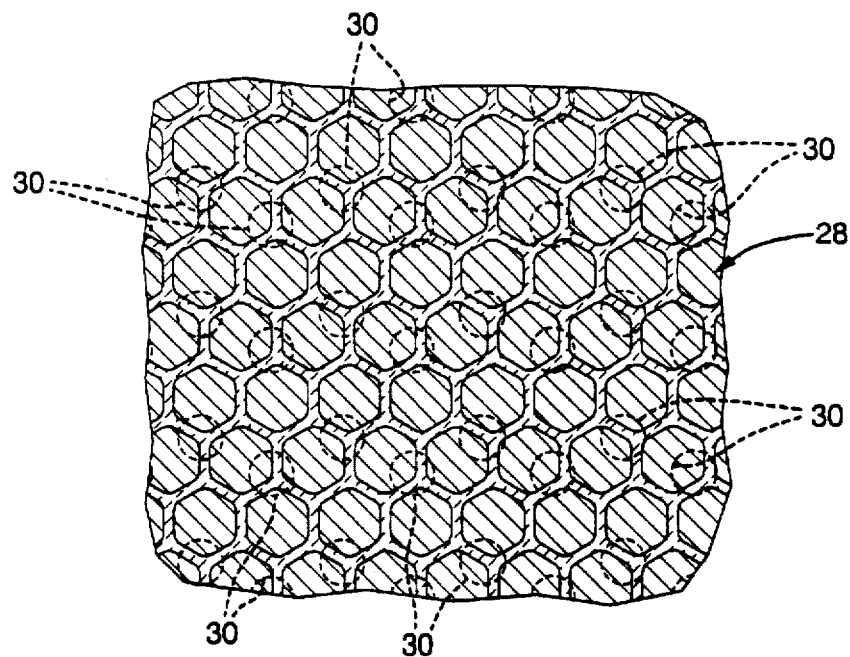
FIG. 5 is a sectional view taken along line 5—5 of FIG. 4 illustrating an extrusion die according to the present invention.
Figure 6:
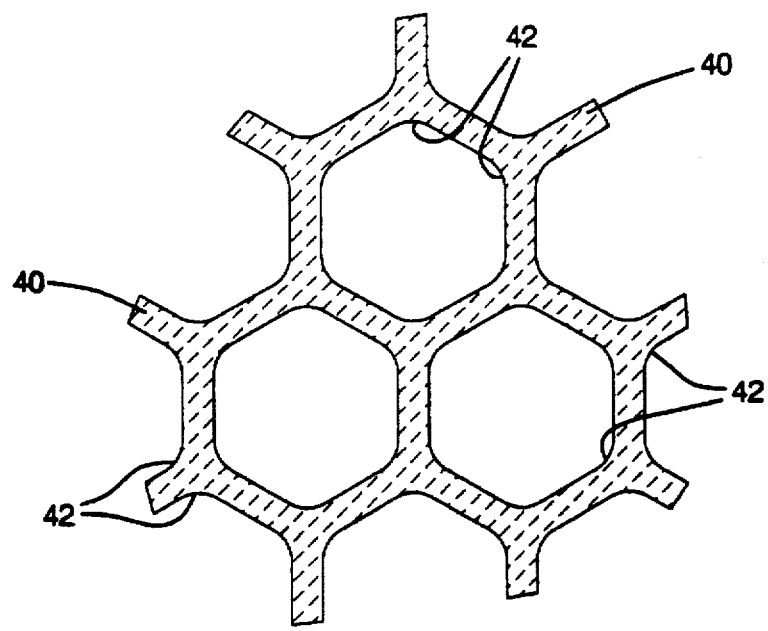
FIGS. 6, 7, 8 and 9 illustrate a variety of substrate cell designs according to the present invention.
Figure 7:
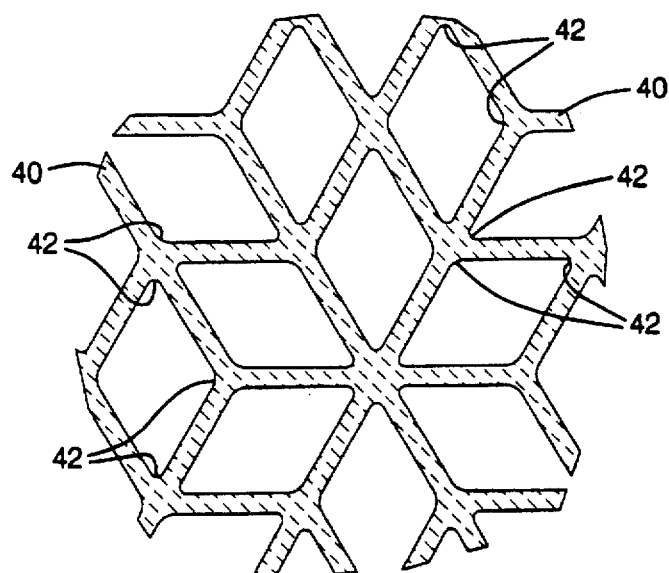
Figure 8:
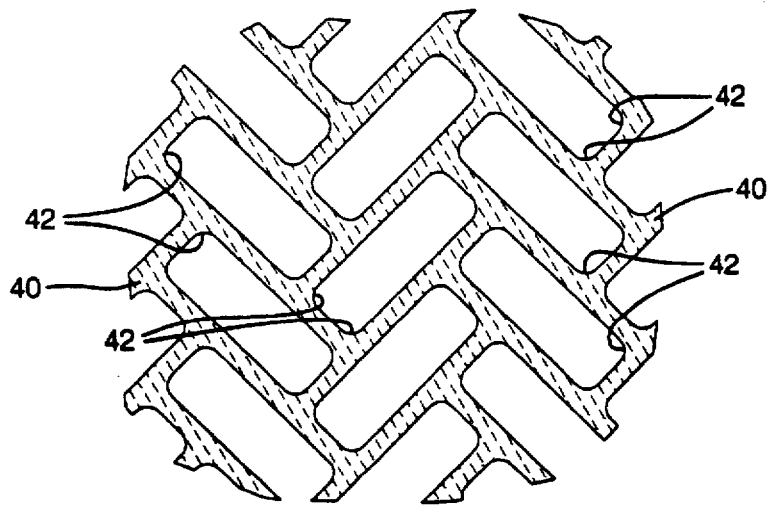
Figure 9:
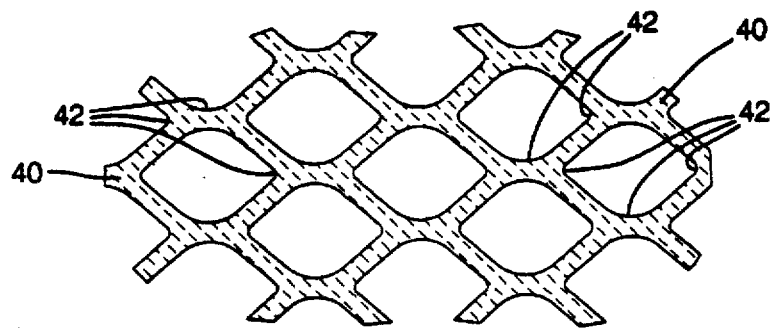

According to the present invention, an extrusion die for making a 400 CPSI monolith with 0.005 inch walls and hexagonal shaped cells was fabricated using electrodes and extrusion dies as described above. After a grid was burned into the extrusion die by a method described above, feedholes were formed in the extrusion die by burning with carbide tubes as described. Feedholes 30 were provided as shown in FIGS. 4 and 5 communicating with the grid of the extrusion die. The die was steel, D2, 0.700 inches thick, hardened and tempered to Rc 52. The holes were 0.046 inch diameter by 0.53 inches deep so as to intersect with the slots which were burned 0.200 inches deep.

Referring to FIG. 4, a ceramic mixture 34 containing various clays, calcinated clays, talcs, silicas and aluminas added in ratios to fire out as cordierite were screened through 150 mesh and were plasticized by adding 3% methyl cellulose, 0.75% of a compatible lubricant, and water. The mixture was then kneaded to obtain a desired consistency, de-aired and then forced through the die in mass assembly under 2000 psi pressure applied by a ram 36. The defect-free extrusion was microwave dried and then fired at 1400° C. for 8 hours to produce a 0.005 wall hexagonal cell cordierite monolith for a catalytic converter. The monolith was coated with a washcoat which evenly distributed along the cell walls due to the rounded corners and the obtuse angle resulting from hexagonal cells. A catalyst was impregnated by pore filling into the washcoat to provide an even catalyst loading throughout the substrate.

A variety of cell designs such as hexagonal, diamond shape, staggered rectangles and lemon shapes can be formed for thin wall dies as illustrated in FIGS. 6–9 according to this invention. Further, the cell design may have variable cell densities. For example, to even out the exhaust volume of flow through the substrate, a higher cell density core with a lower cell density on the periphery cells to force the flow to the periphery of the substrate can be made in accordance with the present invention. As shown in FIGS. 6–9, a catalytic converter substrate according to the present invention includes very thin walls 40. Two walls 40 of the substrate converge to form a rounder corner 42 which provides the above described advantages.

What is claimed is:

1. A method of making an electrode for cutting a catalytic converter substrate die comprising:

cutting spaced apart holes through an electrode block with spaced apart cutting elements;

threading an electrical discharge machining wire through each hole in the electrode block;

moving the wire in a continuous path to cut an open cell through the block, said open cell defined by cell walls, wherein adjacent walls converge at a rounded corner and wherein the rounded corner has a thickness greater than either of the adjacent cell walls.

2. A method as set forth in claim 1 further comprising providing a border of electrode block material surrounding the electrode cell walls.

3. A method as set forth in claim 1 wherein said electrode block material comprises a copper-tungsten alloy.

4. A method as set forth in claim 1 wherein cutting elements comprise a carbide material.

5. A method as set forth in claim 1 wherein said cutting elements are tubular shaped.

6. A method as set forth in claim 4 wherein said cutting elements are tubular shaped.

7. A method of making a ceramic catalytic converter substrate comprising:

providing an electrode having a cutting surface formed by a plurality of cell walls converging at rounded corners;

cutting an extrusion grid in a die with said electrode surface;

providing a feedhole in said die communicating with said grid in the die formed by the electrode surface;

extruding a ceramic material through the feedhole and the grid of the extrusion die to form an extruded substrate having a plurality of open cells defined by adjacent walls converging in a rounded corner wherein the rounded corner has a thickness greater than either of the adjacent walls; and hardening the extruded substrate.

8. A method as set forth in claim 7 wherein each cell has a feedhole connected to a corner of the cell.

9. A method as set forth in claim 7 wherein the feedhole is connected to every other cell.

* * * * *